US010099323B2

(12) United States Patent
Fanton et al.

(10) Patent No.: US 10,099,323 B2
(45) Date of Patent: Oct. 16, 2018

(54) ROTATING STRUCTURE AND A METHOD OF PRODUCING THE ROTATING STRUCTURE

(71) Applicant: ROLLS-ROYCE CORPORATION, Indianapolis, IN (US)

(72) Inventors: Bradley T. Fanton, Plainfield, IN (US); Roy David Fulayter, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 394 days.

(21) Appl. No.: 14/886,904

(22) Filed: Oct. 19, 2015

(65) Prior Publication Data
US 2017/0107999 A1  Apr. 20, 2017

(51) Int. Cl.
*F01D 5/30* (2006.01)
*B23P 15/00* (2006.01)
*F04D 29/32* (2006.01)

(52) U.S. Cl.
CPC .......... *B23P 15/006* (2013.01); *F01D 5/3007* (2013.01); *F01D 5/3092* (2013.01); *F04D 29/322* (2013.01); *F05D 2300/1721* (2013.01)

(58) Field of Classification Search
CPC .... F01D 5/3092; F01D 5/282; F01D 511/008; F01D 5/3007; F01D 11/008; F04D 29/34; F04D 29/32; F04D 29/644; F04D 29/668; F04D 29/322; F05D 2300/501; F05D 2300/506; F05D 2250/71; F05D 2300/1721; B23P 15/06; B23P 15/006
See application file for complete search history.

(56) References Cited

U.S. PATENT DOCUMENTS

| 3,378,230 | A | * | 4/1968 | Toomey | F01D 5/3007 416/219 R |
|---|---|---|---|---|---|
| 4,169,694 | A | | 10/1979 | Sanday | |
| 4,417,854 | A | * | 11/1983 | Cain | F01D 5/284 416/219 R |
| 4,655,687 | A | * | 4/1987 | Atkinson | F01D 11/008 416/190 |
| 5,160,243 | A | * | 11/1992 | Herzner | F01D 5/28 416/220 R |
| 5,240,375 | A | * | 8/1993 | Wayte | F01D 5/28 416/219 R |
| 5,820,347 | A | * | 10/1998 | Bussonnet | F01D 5/323 416/221 |
| 5,975,840 | A | * | 11/1999 | Angle | F04D 1/12 415/109 |
| 6,132,175 | A | * | 10/2000 | Cai | F01D 5/284 403/29 |
| 6,431,835 | B1 | | 8/2002 | Kolodziej et al. | |
| 6,457,942 | B1 | | 10/2002 | Forrester | |
| 6,832,896 | B1 | * | 12/2004 | Goga | F01D 5/3007 416/191 |

(Continued)

*Primary Examiner* — Justin Seabe
*Assistant Examiner* — Joshua R Beebe
(74) *Attorney, Agent, or Firm* — McCracken & Gillen LLC

(57) ABSTRACT

According to one aspect, a rotating structure comprises a hub having a mounting slot defined by a cavity surface and a body having an anchor structure disposed in the mounting slot. A wear member is disposed between the anchor structure and the cavity surface and the wear member has at least first and second portions of first and second material characteristics, respectively.

19 Claims, 8 Drawing Sheets

(56) References Cited

U.S. PATENT DOCUMENTS

| | | |
|---|---|---|
| 7,419,360 B2 | 9/2008 | Chatel et al. |
| 8,485,785 B2 | 7/2013 | Garner et al. |
| 8,672,634 B2 | 3/2014 | Parkos et al. |
| 8,801,385 B2 | 8/2014 | Fabre |
| 8,845,294 B2 | 9/2014 | Belmonte et al. |
| 8,851,854 B2 | 10/2014 | Alexander |
| 2002/0141671 A1* | 10/2002 | Narkon ................ F16C 33/10 384/322 |
| 2009/0060745 A1* | 3/2009 | Douguet ............... F01D 5/3007 416/219 R |
| 2011/0206530 A1* | 8/2011 | Fabre .................... F01D 5/3007 416/229 R |
| 2012/0082551 A1* | 4/2012 | Macchia ............... F01D 5/3092 416/219 R |
| 2012/0107125 A1* | 5/2012 | Reghezza ............. F01D 5/3007 416/220 R |
| 2012/0263595 A1* | 10/2012 | Evans ................... F01D 5/3092 416/189 |
| 2013/0156591 A1* | 6/2013 | Alexander ........... F01D 5/3092 416/221 |
| 2013/0247586 A1 | 9/2013 | Luczak |
| 2014/0147276 A1* | 5/2014 | Roberts, III .......... F01D 5/3084 416/135 |
| 2014/0178202 A1 | 6/2014 | Chatenet et al. |

* cited by examiner

ROTATING STRUCTURE AND A METHOD OF PRODUCING THE ROTATING STRUCTURE

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to rotating machinery, and more particularly, to rotor structures used in turbomachinery or other rotating devices and methods of production thereof.

BACKGROUND

Rotating machines, such as turbomachinery, have rotating parts that are assembled within stationary parts and which must be precisely positioned therein. A rotating machine typically includes a rotatable hub (sometimes referred to as a wheel or a disk) that includes mounting slots or other cavities defined by cavity surfaces that are accessible from outside of the hub. An anchor structure (sometimes referred to as a root or blade root) of a rotatable body (e.g., a fan blade, a turbine blade, etc.) is disposed in each mounting slot or other cavity. Curved roots and straight roots (i.e., linear roots) are two common varieties of blade roots. In general, curved roots and straight roots may be dovetail roots or non-dovetail roots. In some cases, for example, for a blade that comprises an airfoil of a particular shape, a curved root may be preferable to a straight root while a straight root may be preferable in another blade design.

In designs in which a plurality of fan blades is carried by a rotatable hub of a turbofan gas turbine engine, the blade roots of the fan blades are made of a base metal coated with a DFL (dry-film-lubricant) that directly contacts the surfaces defining the mounting slots. This coating system can be worn away quickly due to high localized contact loads, resulting in frequent and costly repairs and disruptions for the customer.

Turbofan blades having straight root dovetails typically have fewer wear problems than curved root dovetails since the worst-case operating scenario for a straight root dovetail is line contact between the hub and the dovetail over the length of the dovetail. High localized contact loads may still occur for straight root designs that include axial tangs and/or high hade angles.

U.S. Pat. No. 4,169,694 discloses a curved root dovetail design with double curvature that results in a more uniform transfer of loads to the mounting slot of the hub. The patent discloses that the double curvature sets the initial point of contact low on the cross section of the dovetail curved root, which forces stresses into a tri-axial state rather than a bi-axial state. However, obtaining this condition in production is unlikely as the tolerances required to achieve this in practice are probably very tight.

U.S. Pat. No. 6,457,942 discloses that fan blades having a curved root dovetail experience point loading contact with a wheel. An axial retention feature is provided to minimize point loading in a blade failure event.

SUMMARY

According to a first aspect, a rotating structure comprises a hub having a mounting slot defined by a cavity surface and a body having an anchor structure disposed in the mounting slot. A wear member is disposed between the anchor structure and the cavity surface and the wear member has at least first and second portions of first and second material characteristics, respectively.

According to another aspect a rotating structure includes a turbomachine hub having a plurality of mounting slots each defined by a cavity surface and a plurality of rotatable fan blades each having an anchor structure disposed in an associated one of the mounting slots. At least one wear member is disposed between each anchor structure and the cavity surface defined by the associated slot and each wear member includes at least two materials having different moduli of elasticity and disposed in discrete portions of the wear member.

According to yet another aspect, a method of producing a rotating structure having a rotatable member and a rotatable hub wherein an anchor member of the rotatable member is adapted for retention by surfaces defining a slot in the hub includes the step of determining stresses experienced by first and second anchor structure portions as a result of the hub rotating the rotatable member. The method further includes the steps of providing a wear member including first and second wear member portions having different wear characteristics that are dependent upon the stresses and assembling the anchor structure and the wear member in the slot so that the wear member is disposed between the anchor structure and the surfaces defining the slot and so that the first and second wear member portions are disposed adjacent the first and second anchor structure portions, respectively.

Other aspects and advantages will become apparent upon consideration of the following detailed description and the attached drawings wherein like numerals designate like structures throughout the specification.

DETAILED DESCRIPTION

Figure 1:
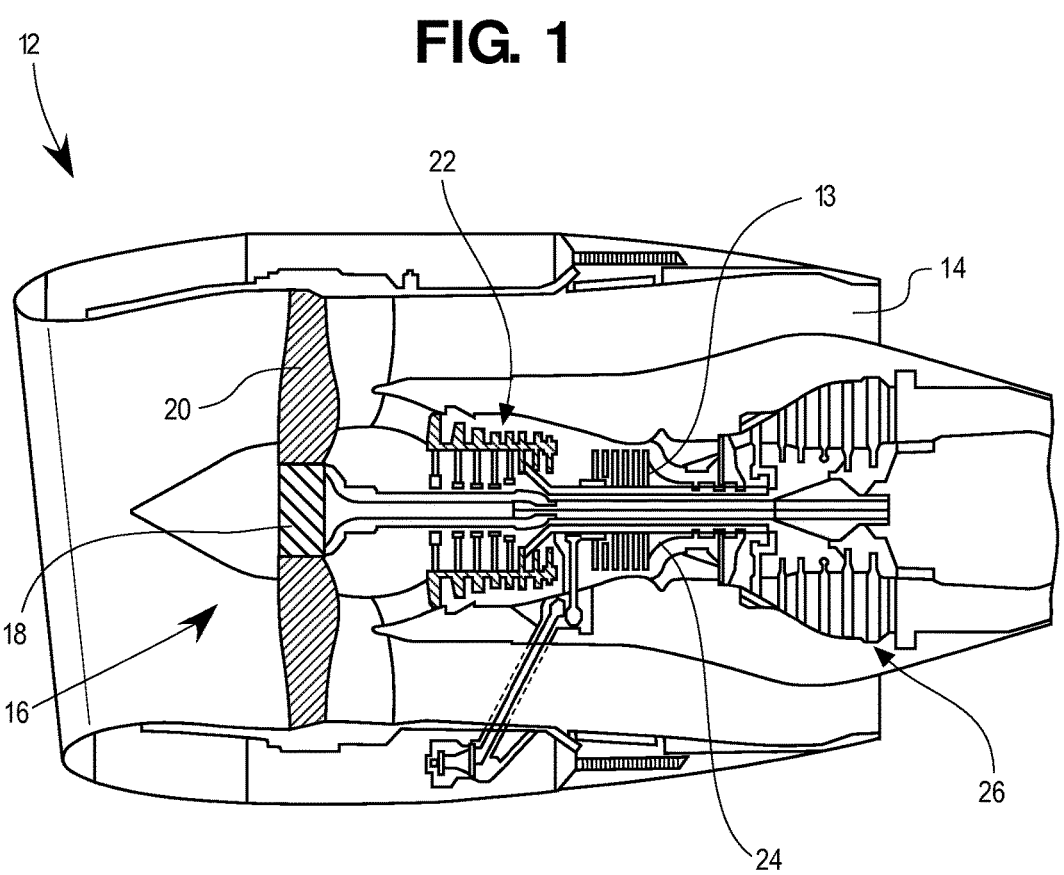
FIG. 1 is a cross sectional view of an exemplary rotating machine in the form of a gas turbine engine.

Referring to FIG. 1, an exemplary rotating machine in the form of a gas turbine engine 12 includes a rotor 13 mounted for rotation within a stator 14. It should be noted that the embodiments disclosed herein may be used in or with any rotating machinery having a rotating member, including the illustrated gas turbine engine or other turbomachinery including a turbofan engine, a turbojet engine, a jet prop engine, etc., as well as non-turbomachinery such as a stand-alone compressor, a pump, a generator, a motor, or the like.

The engine 12 includes a rotating structure in the form of a fan 16 that is mounted on a shaft and that comprises a hub 18 having a plurality of fan blades 20 mounted to the hub 18. The engine 12 further includes a compressor section 22 in fluid communication with the fan 16. A combustion chamber 24 receives compressed air from the compressor section 22 as well as a combustible fuel, and a turbine section 26 converts rapidly expanding combusting fuel and air into rotary motive power.

Figure 2:
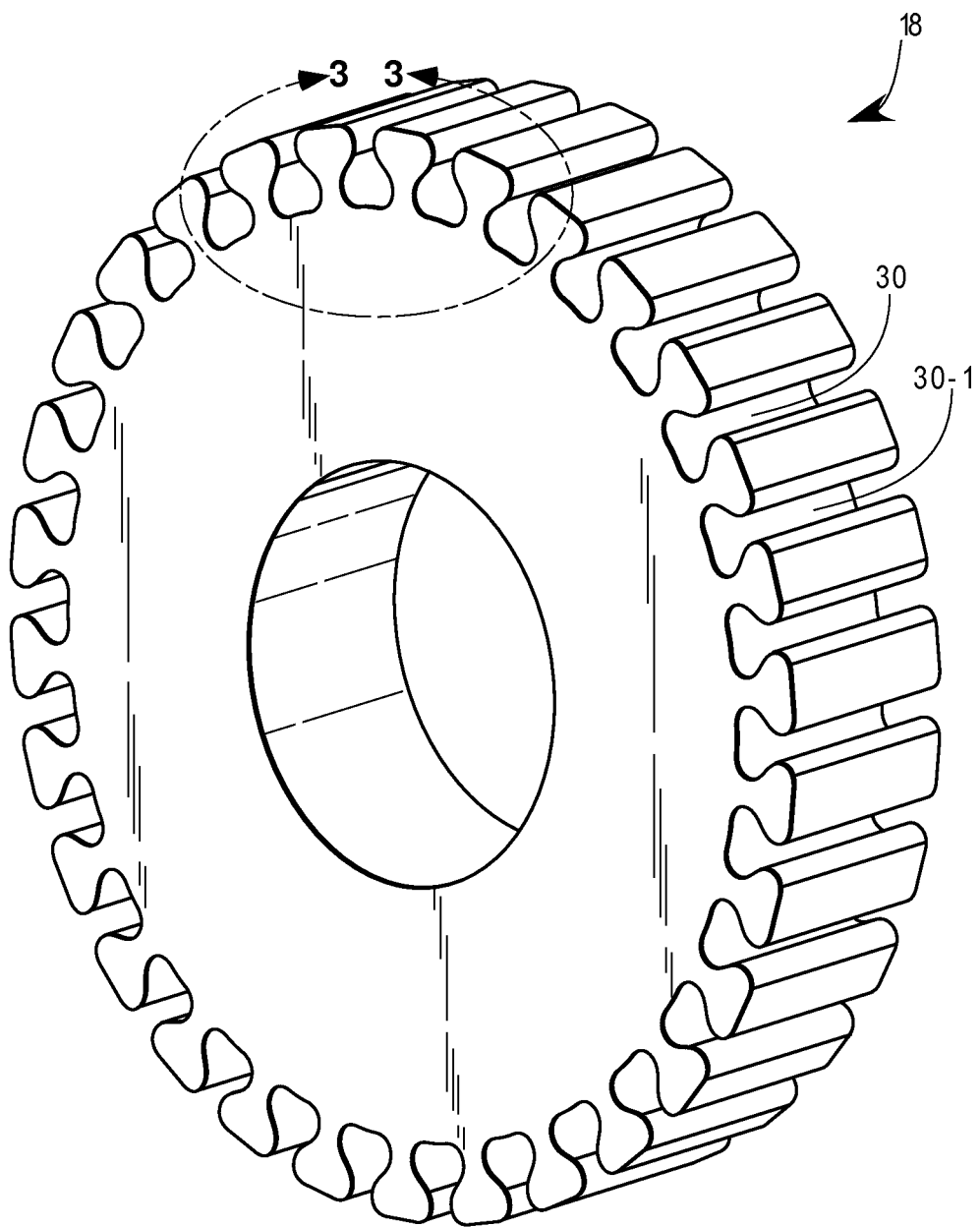
FIG. 2 is a fragmentary isometric view of a hub, which is used in a rotating machine such as the rotating machine of FIG. 1, before installation of a plurality of fan blades in the hub.

Referring now to FIG. 2, the hub 18 of the fan 16 includes a plurality of cavities in the form of mounting slots 30 defined by surfaces formed in a radially outward facing surface of the hub 18. As shown in FIG. 2, the hub 18 includes mounting slots 30 that are straight (e.g., linear) and adapted to accept straight root fan blades. In alternative embodiments, for example, as seen in FIG. 9A, a hub 18a includes mounting slots 30a that are configured to accept curved root fan blades.

As shown in FIG. 2, the hub 18 includes mounting slots 30 that are parallel to the longitudinal axis of the hub 18 in the sense that the mounting slots 30 have a zero hade angle. In alternative embodiments, the hub 18 may include mounting slots 30 each having a bottom surface that is disposed at a non-zero hade angle with respect to the longitudinal axis of the hub 18. In such alternative embodiments, the forward end of a mounting slot 30 may be nearer to the center of the hub 18 than the aft end of the mounting slot 30. Alternatively, the forward end of the mounting slot 30 may be farther from the center of hub 18 than the aft end of the mounting slot 30.

As shown in FIG. 2, the mounting slots 30 may have a zero pitch angle. In alternative embodiments, a hub 18 may include mounting slots 30 that have a non-zero pitch angle.

Figure 3:
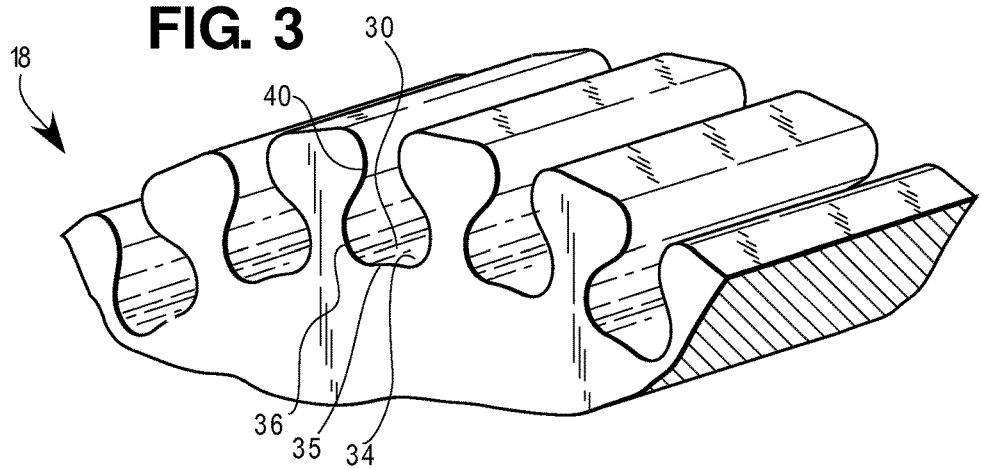
FIG. 3 is a fragmentary, enlarged isometric view of a portion of the hub of FIG. 2 before installation of a plurality of fan blades therein.

Referring now to FIG. 3, a mounting slot 30 includes a bottom surface 34 defining a bottom portion 35, a middle portion 36, and an upper portion 40. As shown, the mounting slot 30 has a dovetail shape that includes the upper portion 40 having a relatively small width, the middle portion 36 having a relatively large width, and the bottom portion 35 having a relatively intermediate width. In alternative embodiments, a mounting slot 30 may have a triangular shape that includes an upper portion 40 having a relatively small width, a middle portion 36 having a relatively intermediate width, and/or a bottom portion 35 having a relatively large width. Additionally, or alternatively, a mounting slot 30 may be of a hexagonal shape, an octagonal shape, and/or another shape that accommodates a shape of a fan blade root.

Figure 4:
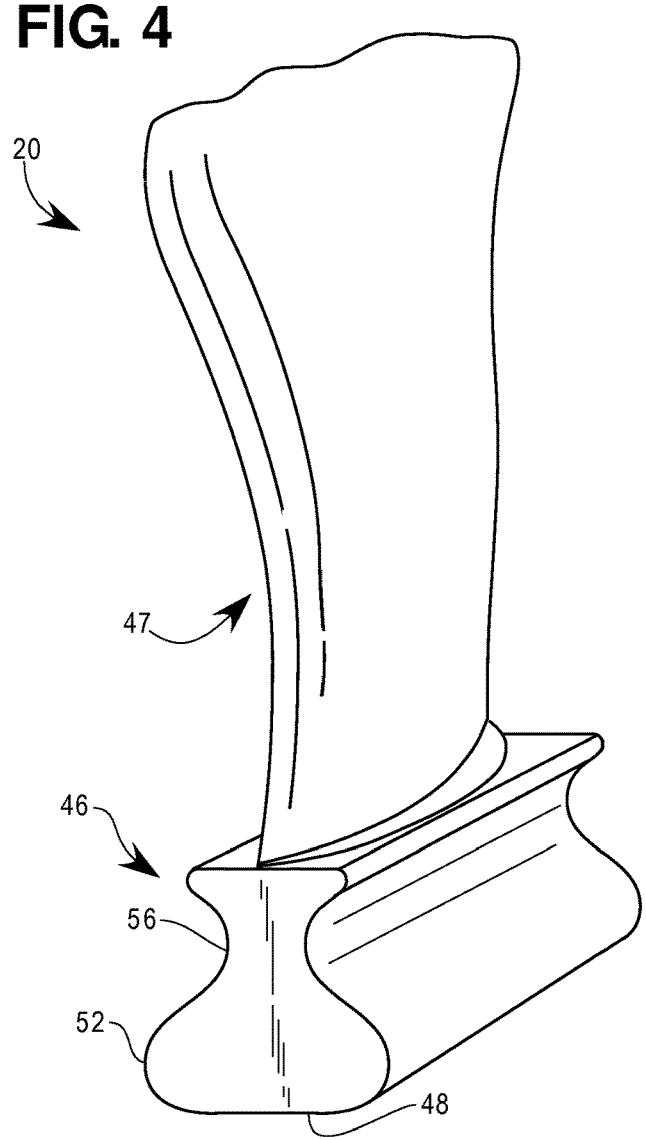
FIG. 4 is an isometric view of an exemplary rotatable body in the form of a fan blade.

Referring now to FIG. 4, an exemplary rotatable body in the form of a fan blade 20 includes an anchor structure 46 (sometimes referred to as a blade root) and an airfoil 47. The anchor structure 46 has a dovetail shape that fits the shape of a mounting slot 30 and includes a bottom section 48, a middle section 52, and an upper section 56. When the anchor structure 46 is disposed in surfaces defining the mounting slot 30 (e.g., as shown in FIG. 5), the upper section 56 is disposed in the upper portion 40 of the mounting slot 30, the middle section 52 is disposed in the middle portion 36 of the mounting slot 30, and the bottom section 48 is disposed in the bottom portion 35 of the mounting slot 30.

Figure 5:
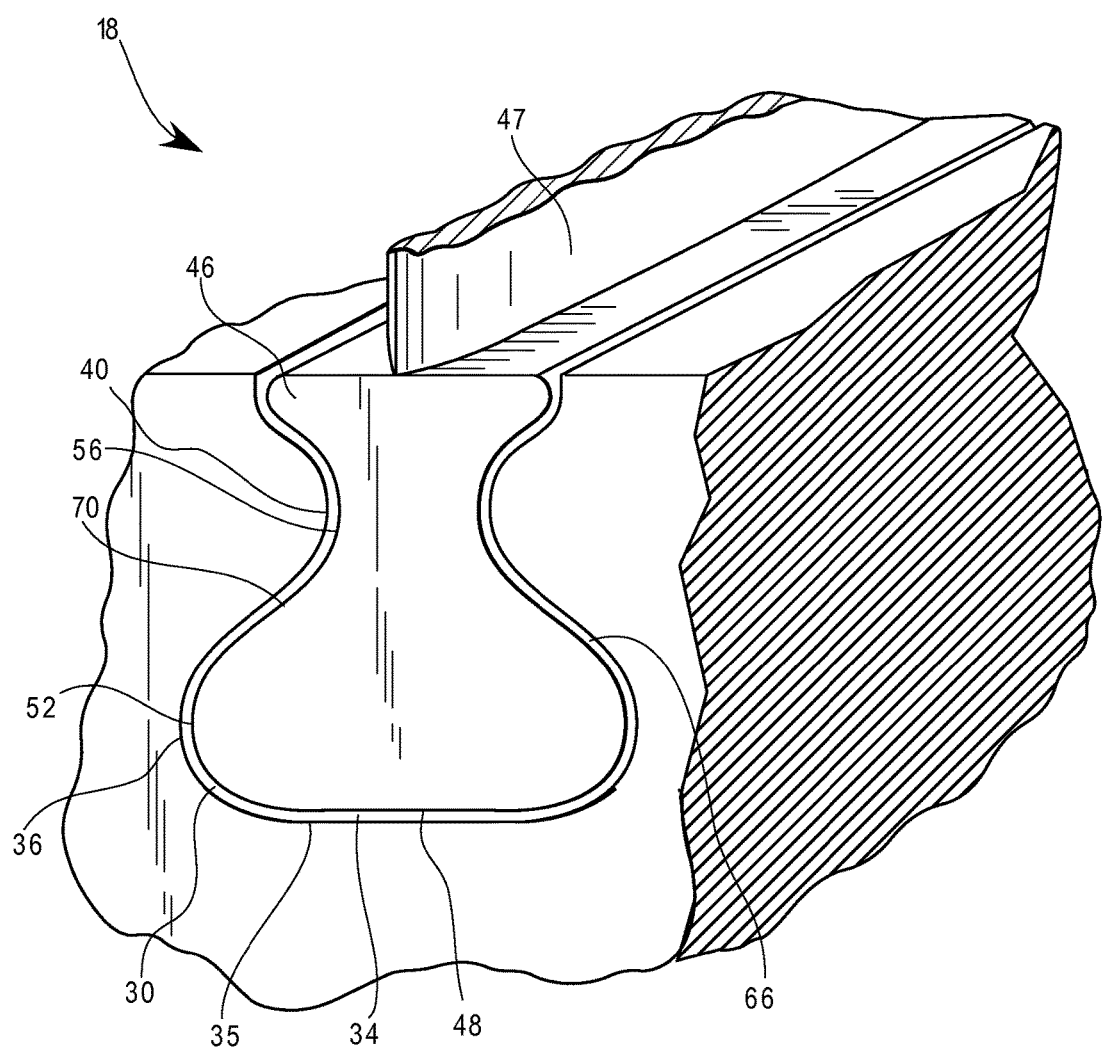
FIG. 5 is a fragmentary, enlarged isometric view of a mounting slot of the portion of the hub of FIG. 3 after installation of the rotatable body of FIG. 4.

Referring to FIG. 5, as the hub 18 rotates from idle to maximum speed, the fan blade 20 experiences a centripetal force directed toward the center of the hub 18 resulting from the dovetail shape of the anchor structure 46 and the interfering shape of the mounting slot 30 that together retain the fan blade 20 on the hub 18.

The forward or suction side is illustrated in FIG. 5 and is identical to the aft or pressure side. The anchor structure 46 includes a first or right flank surface 66 disposed on the suction side of the airfoil 47 and a second or left flank surface 70 disposed on the pressure side of the airfoil 47.

Straight root designs that include axial tangs and high hade angles may experience high point loads during operation. For example, assume that a forward end of the mounting slot 30 is closer to the center of the hub 18 than the aft end of the mounting slot 30 (i.e., a non-zero hade angle). Assume further that a retention tang (not shown) is associated with the forward end of the fan blade 20. In such an embodiment, the centripetal loading of the fan blade 20 during rotation combined with a hade angle creates an axial load (i.e., along the longitudinal axis of the anchor structure 46) causing wear at the aft end of the anchor structure 46. In such an embodiment, the forward end of the anchor structure 46 may also experience wear in some cases.

Figure 6:
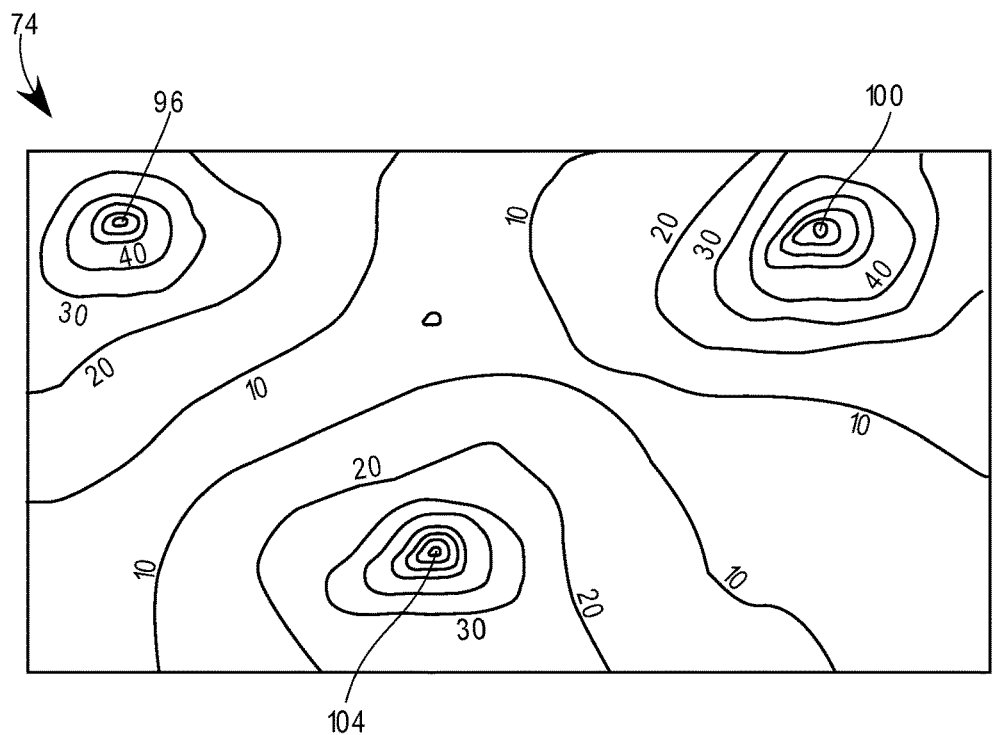
FIG. 6 is an exemplary stress diagram that illustrates isobars of uniform stress to show contact stress associated with an anchor structure of the rotatable body of FIG. 9A.

FIG. 6 illustrates stresses experienced by the anchor structure during operation for the case with a curved root design, for example as seen in FIG. 9A and comprising anchor structure 46a. During rotation, curved root dovetail designs have a tendency to experience point loads on the ends of the pressure side (e.g., the forward end 80 and the aft end 82 of a left flank surface 70a as seen in FIG. 9A) of the curved anchor structure 46a and in the middle 86 of the suction side (e.g., the middle 86 of a right flank surface 66a) of the curved anchor structure 46a. Such a pattern of point loading is especially characteristic of curved root blades made of composite or metallic material and is primarily due to the curved root shape and the back and forth motion of a curved root airfoil 47a experiencing synchronous vibration i.e., excitations occurring at integer multiples of fan speed (e.g., originating with vanes, struts, and/or low order inlet distortion) and/or asynchronous vibrations due to non-integer excitation and/or self-excitations (buffeting, flutter, and/or stall). High point loading in a particular area causes wear of a dry-film lubricant (DFL) coating and/or a copper nickel indium (Cu-Ni-In) coating of the curved anchor structure 46a. As the traditional Cu-Ni-In and/or DFL coating system wears under stress, the coefficient of friction increases and there is contact between the curved anchor structure 46a, which is made of titanium, and the curved mounting slot 30a, which is also defined by titanium surfaces. Such contact causes erosion of the surfaces defining the curved mounting slot and/or the curved anchor structure 47a. The damage, wear, and/or failure may begin in one area and may spread over time and may force a user/customer to perform early removal and/or repair.

The diagram of FIG. 6 illustrates the stresses on a rectangular plane, with upper portions of the plane of such FIG. 6 illustrating stresses experienced by portions of the anchor structure 46a (FIG. 9A) toward the second or left flank surface 70a, lower portions of the plane of FIG. 6 illustrating stresses experienced by portions of the anchor structure 46a toward the first or right flank surface 66a, and intermediate portions of the plane illustrating stresses experienced by portions intermediate the flank surfaces 66a and 70a, for example, at or proximate a bottom section 48a as seen in FIG. 9A. Isobars denoting points of equal stress are shown in FIG. 6. An isobar with a "20" denotes points of higher stress than an isobar with a "10" ("10" and "20" may refer to relative values of stress or to kilo pounds per square inch (ksi)). As seen in FIG. 6, relatively high point loads are experienced by end portions 96 and 100 on the pressure side and by a central portion 104 on the suction side.

Figure 7:
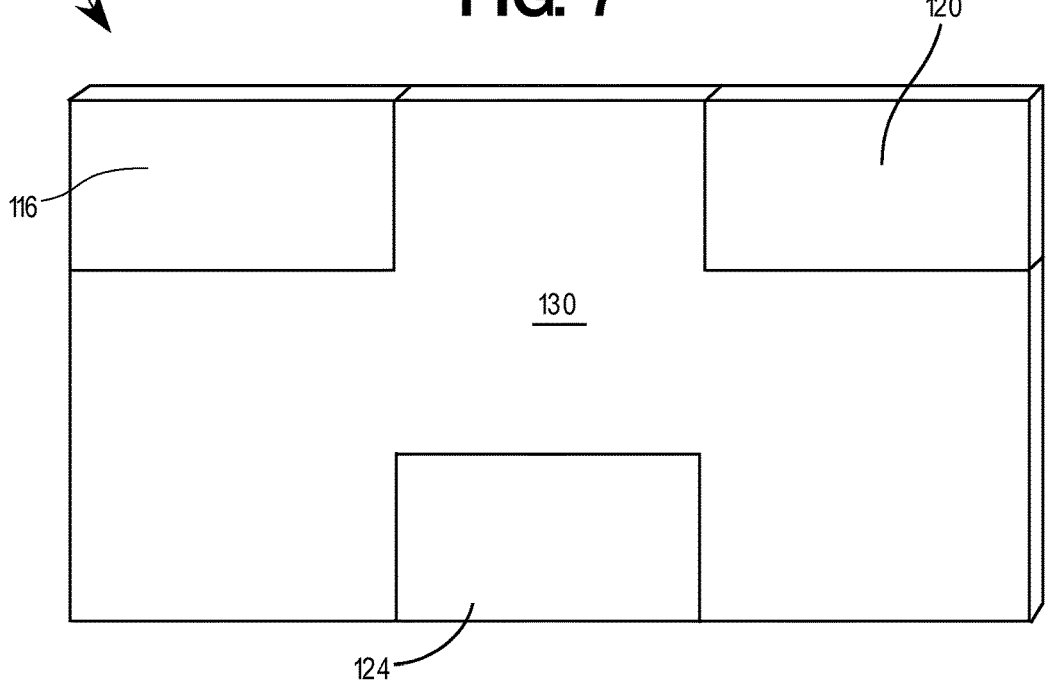
FIG. 7 is a diagrammatic isometric view of a wear member before forming thereof.

Referring to FIG. 7, a wear member 110 may be manufactured in any suitable fashion (such as described hereinafter in connection with FIGS. 5, 9, and 10) taking into account the stresses experienced by the anchor structure 46a and the wear member 110 and may be disposed in a space 111a between the anchor structure 46a and the surfaces defining a mounting slot 30a of FIG. 9A (FIG. 7 illustrates the wear member 110 as a planar structure of constant thickness, although in practice the wear member 110 may be formed either initially or at a subsequent step into a different shape). In a general sense, the wear member 110 includes at least first and second sections that have different characteristics. The different characteristics may be obtained through the use of different material(s), material(s) having different physical properties, material(s) produced by different manufacturing and/or processing techniques, materials of different dimensions, (such as thickness), materials of different shapes, etc., and combinations thereof. More specifically, in the illustrated embodiment, the wear member 110 is designed to include first through fourth sections 116, 120, 124, and 130, respectively. The first, second, and third sections 116, 120, and 124 may be made of a relatively soft metal (i.e., a material having a relatively low modulus of elasticity), such as brass, whereas the section 130 may be made of a relatively hard material (i.e., a material having a relatively high modulus of elasticity), such as steel.

The wear member 110 is formed and/or shaped to match the shape of the anchor structure 46a and is placed within the space 111a (FIG. 9A) between the anchor structure 46a and the surfaces defining the mounting slot 30a. The sections 116, 120, and 124 are disposed opposite the portions 96, 100, and 104 that encounter relatively high stresses during operation of the fan 16 whereas the remaining section 130 is disposed opposite portions that encounter relatively lower stresses (again, as shown in FIG. 6). The relatively softer brass material is capable of distributing the point loads along the anchor structure 46a. The harder steel material, on the other hand, is placed in regions of relatively lower contact stress to help the wear member 110 maintain a particular shape and/or prevent extrusion of the softer brass material due to plastic deformation. Additionally, the harder steel material transfers some of the load away from high contact stress areas, which in turn helps distribute contract stress more uniformly along the anchor structure 46a. The resulting more uniform distribution of contact stress reduces wear.

Figure 8:
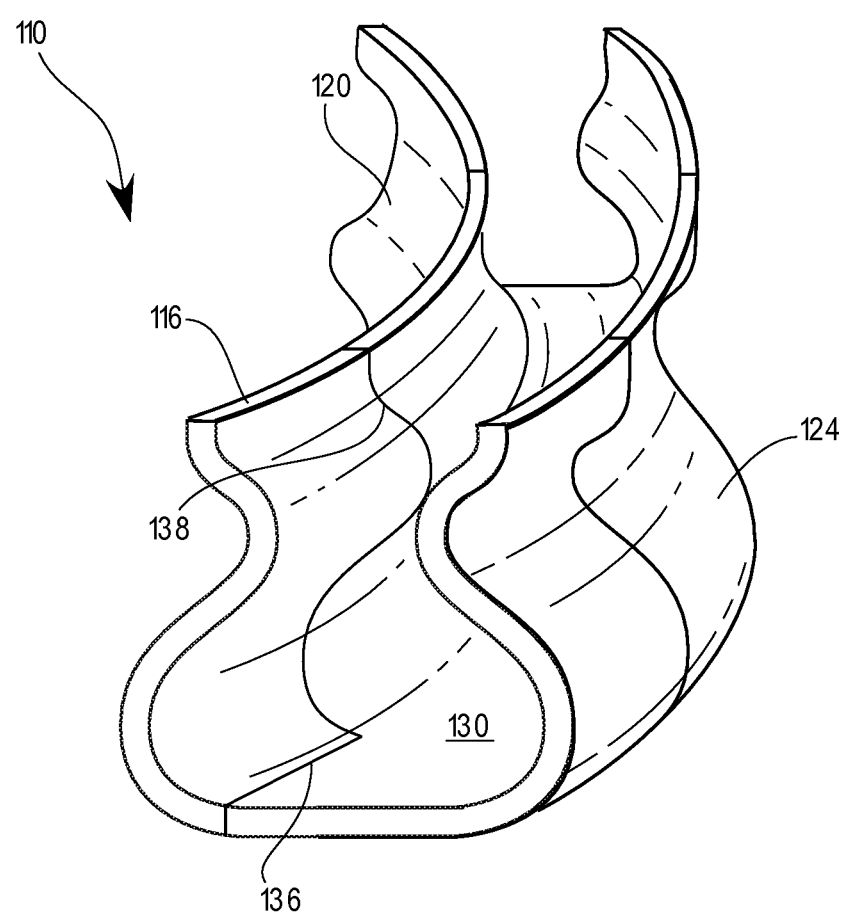
FIG. 8 is a perspective view of the wear member of FIG. 7 after forming thereof to fit an anchor structure of FIG. 9A.

Referring now to FIGS. 8 and 9A, a transition 136 between a first material and a second material of the wear member 110 (e.g., the transition 136 of FIG. 8 between the brass portion 116 and the steel portion 130) defines a line extending in an axial direction with respect to the longitudinal axis of the mounting slot 30a. Another transition 138 between the first material and the second material defines a line extending in a direction tangent to the surface of the mounting slot 30a and perpendicular to the longitudinal axis of the mounting slot 30a (e.g., this may comprise the transition 138 of FIG. 8 between the brass portion 116 and the steel portion 130).

Figure 9:
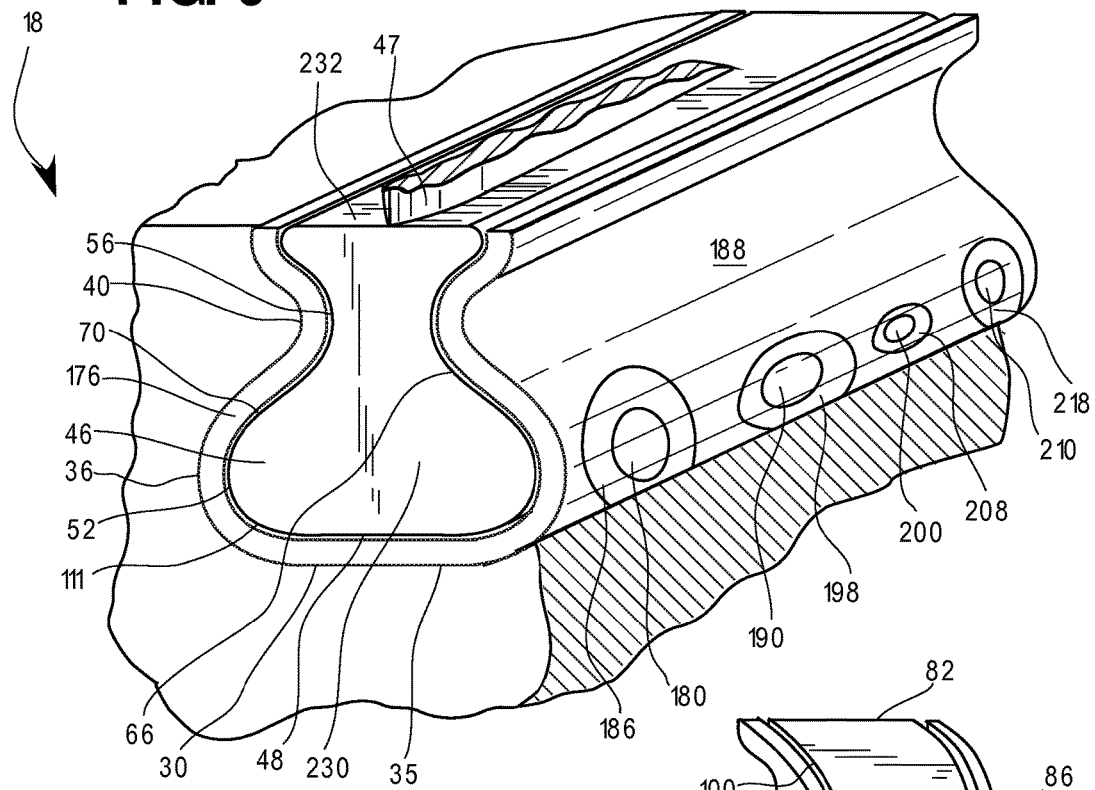
FIG. 9 is a fragmentary, enlarged isometric view of a mounting slot of the portion of the hub of FIG. 3 after installation of the wear member of FIG. 11 in the rotatable body of FIG. 4.
Figure 10:
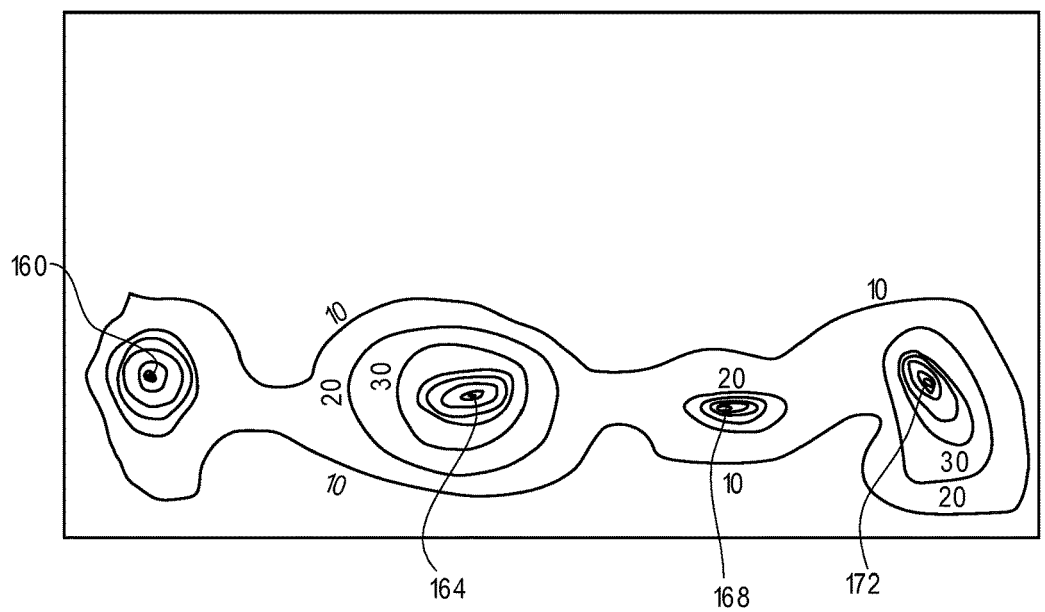
FIG. 10 is another exemplary stress diagram similar to FIG. 6 for another root design, for example, that of FIGS. 2-5.

FIG. 10 is a stress diagram similar to FIG. 6 illustrating stresses experienced by one or more portions of an anchor structure during rotation. The anchor structure may comprise the anchor structure 46a during operation in a mode different than the operating mode illustrated in FIG. 6 or may comprise operation of the linear anchor structure 46 of FIG. 9 (the latter example is described hereinafter). The stresses may be determined analytically, by observation of wear characteristics of the anchor structure 46 in service, and/or by using one or more sensors. The stresses may be determined while the fan blade 20 is being rotated by the hub 18 or at any time thereafter. The stress diagram includes a plurality of isobars identifying first through fourth high stress areas 160, 164, 168, and 172.

Figure 11:
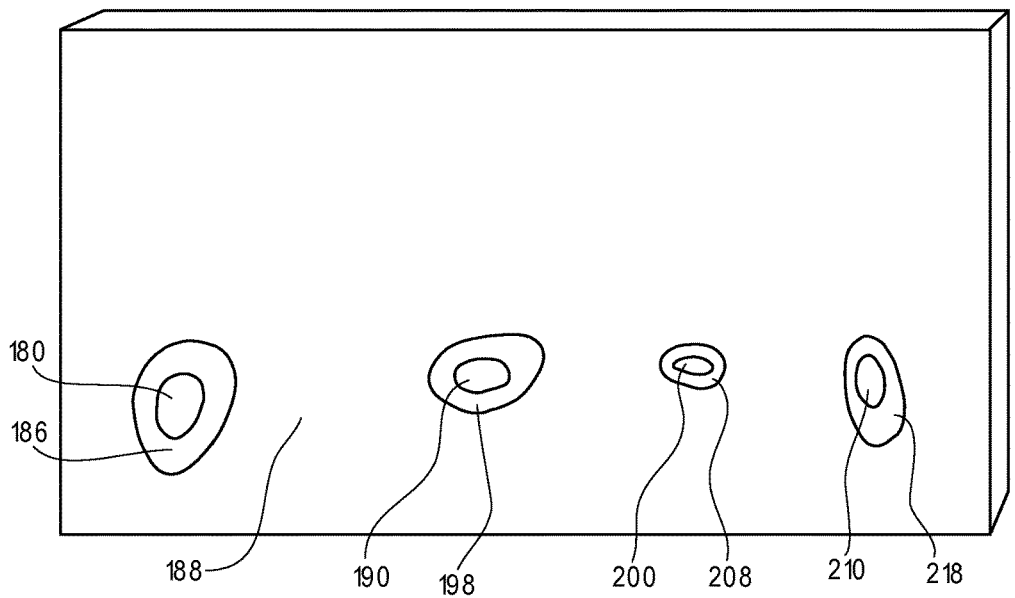
FIG. 11 is a diagrammatic isometric view of an alternative embodiment of a wear member before forming thereof that may be used, for example, with the design of FIGS. 2-5.

Referring now to FIG. 11, a manufacturing device is controlled in accordance with the stresses to produce a wear member 176 (which, like the wear member 110 shown in FIGS. 8 and 9A, may be in the form of a sheath, a shim, a cover, a sheet, or the like) made of portions having different wear characteristics that are dependent upon the stresses. In the illustrated embodiment, the wear member 176 comprises a sheet of metal made of multiple materials that is to be placed between the surfaces defining the mounting slot 30 and the anchor structure 46 to reduce wear. The wear member 176 has a length, width, and thickness that fits in a space 111 between anchor structure 46 and the surfaces defining the mounting slot 30.

Also in the illustrated embodiment, the wear member 176 generally includes a steel portion for areas corresponding to low contact stress, a hard brass portion for areas corresponding to intermediate contact stress, and a soft brass portion for areas corresponding to high contact stress. Specifically, the wear member 176 includes a first soft brass portion 180, a first hard brass portion 186, a steel portion 188, a second soft brass portion 190, and a second hard brass portion 198. Additionally, the wear member 176 includes soft brass portions 200, 210 and hard brass portions 208, 218. A top third and a portion of a middle third of the wear member 176 comprise steel without any brass because corresponding portions of the stress diagram of FIG. 10 do not show high stresses at such locations.

In alternative embodiments, the wear member 110 or 176 may comprise two, three, four, or more materials each having a different elastic modulus than at least one of the other materials. In some embodiments, the wear member 110 or 176 may comprise two or more materials wherein the elastic moduli of the materials change differentially with temperature or another parameter (e.g., at a lower temperature, a first elastic modulus of a first material is slightly different from a second elastic modulus of a second material, but at a higher temperature, the first elastic modulus is substantially different than the second elastic modulus). In some embodiments, the wear member 110 or 176 may include a first material at a first location comprising a steel (or another metal) with a relatively high modulus of elasticity and a second material comprising a steel with a relatively lower modulus of elasticity. In other embodiments, materials such as bronze, composite material with nanovate coating (nanovate nickel, nanovate cobalt, nanovate zinc, or the like), polymer material, carbon fiber, and/or the like may be included in the wear member 110 or 176.

In alternative embodiments, the wear member 110 or 176 may comprise at least first and second materials where at least one transition between the at least first and second materials is not abrupt (i.e., discontinuous), but rather occurs gradually. For example, the two materials may be blended using metallurgy techniques where material layers are successively folded over each other and forged together in one piece, similar or identical to techniques used by ancient sword makers. In more specific embodiments, the wear member 110 or 176 comprises three, four, or more materials that have gradual transitions therebetween. Alternatively, the wear member 110 or 176 may comprise three, four, or more materials that have discontinuous and/or multiple step-wise discontinuous transitions therebetween or a combination of discontinuous and gradual transitions.

While the wear member 110 is illustrated as fully covering the left flank surface 70a and the right flank surface 66a of the anchor structure 46a, respectively, in alternative embodiments, the wear member 110 may cover a portion of the left flank surface 70a and/or a portion of the right flank surface 66a. This is also possible in connection with the wear member 176.

Additionally, or alternatively, the wear member 110 may cover a portion or the entirety of an end surface 230a of the anchor structure 46a that faces forwardly. Additionally, or alternatively, the wear member 110 may cover a portion or the entirety of the surface (not visible) of the anchor structure 46a that faces aft. By covering the forward end and/or the aft end of the anchor structure 46a, the wear member 110 may protect the anchor structure 46a from damage resulting from high axial loading against, for example, one or more retention features, such as one or more tangs. The wear member 176 may similarly partially or fully cover one or both ends of the anchor structure 46.

Figure 9A:
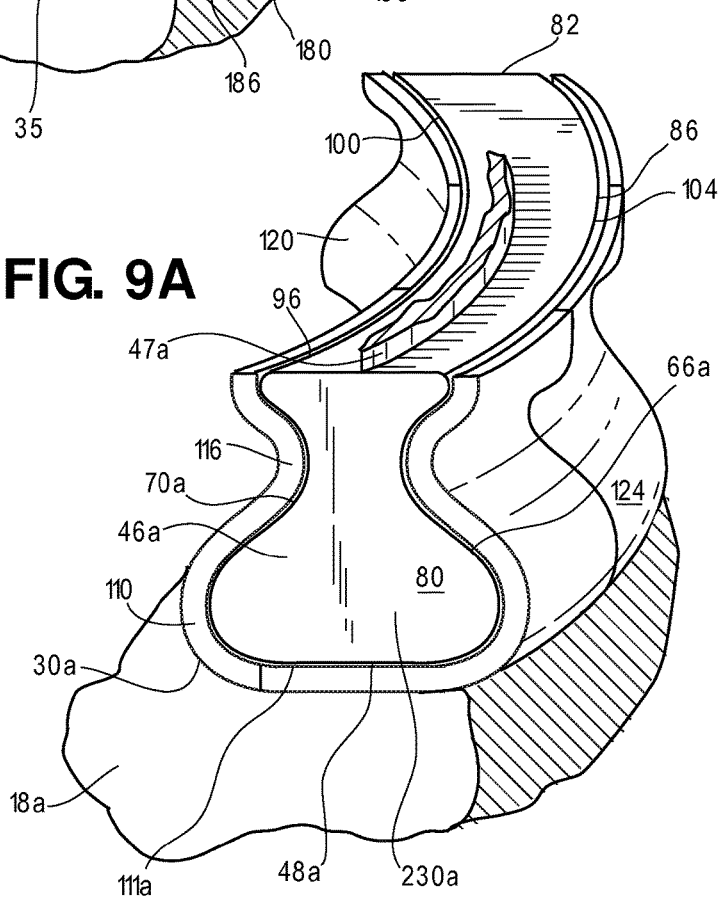
FIG. 9A is a fragmentary, enlarged perspective view of a mounting slot of a hub after installation of the wear member of FIG. 8 in a rotatable body having a curved root design.

In some embodiments, for example as seen in FIG. 9 but not limited thereto inasmuch as the following features could be used in any of the embodiments described herein (including the wear member 110), the wear member 176 extends up to the level of a platform 232 where the airfoil 47 and the anchor structure 46 meet. Additionally, or alternatively, the wear member 176 may extend over the level of the platform 232 and/or partially or fully cover the radially outward facing surface of the hub 18 adjacent to the mounting slot 30. Still further, the wear member 176 may extend into an adjacent second mounting slot 30-1 (FIG. 2) and further optionally around a second anchor structure of a second fan blade. In some embodiments, the wear member 176 may extend about a plurality of anchor structures 46 of a plurality of fan blades 20 disposed in the hub 18. This could be true of the wear member 110.

In some embodiments, the wear member 110 or 176 may be used in addition to a Cu-Ni-In coating and/or a DFL coating. Alternatively, the wear member 110 or 176 may be used instead of the Cu-Ni-In coating and/or the DFL coating. In some implementations, the wear member 110 or 176 may comprise a single material having varying thicknesses. For example, the thickness of the wear member 110 at the left flank surface 70a may be greater than the thickness of the wear member 110 at the bottom section 48a. The thickness of the wear member 110 in a particular region may correspond to a level of stress experienced by a particular region of the anchor structure 46a during fan operation.

INDUSTRIAL APPLICABILITY

In summary, a wear member made of multiple materials spreads out contact stresses to multiple areas of a blade root, which lowers the maximum contact stress and therefore, reduces wear of the blade root and/or a mounting slot. The wear member comprises a plurality of materials disposed at locations based on stress levels experienced by the blade root. Different material responds differently to stress and a particular combination of materials in particular locations of the wear member optimally reduces maximum contact stress, and therefore, reduces wear. For example, for composite fan blades, the wear member provides a protective wear layer between a metallic hub and a composite dovetail-shaped blade root.

In a specific embodiment, the wear member provides convenience because the wear member may be replaced while a jet engine is on wing. In such a scenario, maintenance steps include removing the blades from the fan, adding/replacing the wear member, and reinstalling the blades on the fan on their original mounting slot locations on the hub of the fan, and/or performing weight balancing. This is in contrast to the maintenance procedure currently required when using DFL and/or Cu-Ni-In coating, which may include the steps of: removing the blades from the fan, replacing the blades with temporary blades; performing weight balancing; transporting the original blades to another location for chemical stripping of the DFL and/or Cu-Ni-In wear protection material; performing a plasma spray with DFL and/or Cu-Ni-In coating to reapply wear protection material; transporting the blades back to the engine; removing the temporary blades; reinstalling the original blades; and undertaking weight balancing.

The wear member may be used in a "fit and forget" maintenance regime and be replaced at a regularly-scheduled engine overhaul. The wear member may be used to repair existing rotating structures or may be installed on the rotating structures during manufacturing/assembly. The wear member eliminates the need for coatings made of chemicals that are harmful to humans and/or the environment and may be used in a manner similar to a chocking pad (e.g., the wear member may reduce or avoid blade clapping at low rotational speeds).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A rotating structure, comprising:
a hub having a mounting slot defined by a cavity surface;
a body having an anchor structure disposed in the mounting slot; and
a wear member disposed between the anchor structure and the cavity surface,
wherein the wear member has at least first and second portions of first and second material characteristics, respectively, the first material extends between inner and outer surfaces of the first portion, the second material extends between inner and outer surfaces of the second portion, and the wear member is disposed in the slot such that the outer surfaces of the first and second portions abut the cavity surface and the inner surfaces of first and second portions abut a surface of the anchor structure; and
wherein each of the first and second portions includes first and second metals respectively.

2. The rotating structure of claim 1, wherein the wear member includes a transition from the first portion to the second portion and wherein the transition defines a line extending in an axial direction with respect to a longitudinal axis of the mounting slot.

3. The rotating structure of claim 1, wherein the wear member includes a transition from the first portion to the second portion and wherein the transition defines a line extending in a direction tangent to the cavity surface.

4. The rotating structure of claim 1, wherein the first portion includes a first material and the second portion includes a second material softer than the first material.

5. The rotating structure of claim 1, wherein the first and second metals comprise brass and steel, respectively.

6. The rotating structure of claim 1, wherein the anchor structure has one of a curved and a linear shape.

7. The rotating structure of claim 1, wherein at least one of a gradual and a discontinuous transition is disposed between the first portion and the second portion.

8. The rotating structure of claim 1, wherein each of the first and second portions includes first and second types, respectively, of a single metal wherein the first and second types have different moduli of elasticity.

9. The rotating structure of claim 1, wherein each of the first and second portions includes first and second materials, respectively, wherein each of the first and second materials comprises at least one of brass, bronze, steel, and a composite metallic material with nanovate coating.

10. The rotating structure of claim 9, wherein the wear member has a third portion separate from the first and second portions having one of the first and second characteristics.

11. The rotating structure of claim 9, wherein the first material is harder than the second material.

12. The rotating structure of claim 1, wherein the wear member covers at least one of a first side and a second side of the anchor structure.

13. A rotating structure, comprising:
a turbomachine hub having a plurality of mounting slots each defined by a cavity surface;
a plurality of rotatable fan blades each having an anchor structure disposed in an associated one of the mounting slots; and
at least one wear member disposed between each anchor structure and the cavity surface defined by the associated mounting slot,
wherein each wear member includes at least a first and a second material, each having different moduli of elasticity and disposed in respective discrete first and second portions of the wear member, the first material extends between inner and outer surfaces of the first portion, the second material extends between inner and outer surfaces of the second portion, and the wear member is disposed in the slot such that the outer surfaces of the first and second portions abut the cavity surface and the inner surfaces of first and second portions abut a surface of the anchor structure; and
wherein each of the first and second portions includes first and second metals respectively.

14. The rotating structure of claim 13, wherein each of the at least two materials comprises at least one of brass, bronze, steel, and a composite metallic material with nanovate coating.

15. The rotating structure of claim 14, wherein the anchor structure has one of a curved and a linear shape.

16. The rotating structure of claim 15, wherein at least one of a gradual and a discontinuous transition is disposed between the at least two materials.

17. A method of producing a rotating structure having a rotatable member and a rotatable hub wherein an anchor member of the rotatable member is adapted for retention by a surface defining a slot in the hub, the method comprising the steps of:
Determining stresses experienced by first and second anchor structure portions as a result of the hub rotating the rotatable member;
Providing a wear member including first and second wear member portions made of first and second metallic materials, respectively, having different wear characteristics that are dependent upon the stresses, the first material extending between inner and outer surfaces of the first wear member portion, and the second material extending between inner and outer surfaces of the second wear member portion; and
Assembling the anchor structure and the wear member in the slot so that the wear member is disposed between the anchor structure and the surface defining the slot and so that the outer surfaces of the first and second wear member portions abut the surface defining the slot and the inner surfaces of the first and second wear member portions abut a surface of the anchor structure.

18. The method of claim 17, wherein the step of providing the wear member comprises the step of producing at least one of a discontinuous and a gradual transition between the first and second wear member portions.

19. The method of claim 18, wherein the step of providing the wear member comprises the step of producing first and second wear member portions including first and second materials, respectively, wherein each of the first and second materials comprises at least one of brass, bronze, steel, and a composite metallic material with nanovate nickel coating.

* * * * *